United States Patent
Luffman

[11] Patent Number: 5,407,604
[45] Date of Patent: Apr. 18, 1995

[54] HUMIDIFIER USING A NEUBILIZER

[76] Inventor: Douglas Luffman, R.R. #1, Kapuskasing, Ontario, Canada, P5N-2X7

[21] Appl. No.: 186,642
[22] Filed: Jan. 26, 1994
[51] Int. Cl.$^6$ ............................................. B01F 3/04
[52] U.S. Cl. ........................................ 261/4; 261/5; 261/81; 261/DIG. 48; 261/DIG. 15; 261/DIG. 46; 210/94
[58] Field of Search ...... 261/4, 5, DIG. 48, DIG. 15, 261/81, DIG. 34, DIG. 46; 210/94

[56] References Cited
U.S. PATENT DOCUMENTS

| | | | |
|---|---|---|---|
| 2,781,312 | 2/1957 | Klumb et al. | 210/94 |
| 3,472,496 | 10/1969 | Coleman et al. | 261/DIG. 15 |
| 3,612,033 | 9/1971 | Chilcoat | 126/143 |
| 3,635,210 | 1/1972 | Morrow | 126/113 |
| 3,746,043 | 2/1973 | Chilcoat | 126/143 |
| 3,824,985 | 7/1974 | Hetherington | 261/DIG. 15 |
| 3,990,427 | 11/1976 | Clinebell | 261/DIG. 15 |
| 4,211,735 | 7/1980 | Berlin | 261/DIG. 15 |
| 4,239,956 | 12/1980 | Morton . | |
| 4,257,989 | 3/1981 | Nishikawa | 261/DIG. 48 |
| 4,631,152 | 12/1986 | Uchida et al. | 261/DIG. 48 |
| 4,724,104 | 2/1988 | Kim | 261/DIG. 48 |
| 4,738,806 | 4/1988 | Noma et al. | 261/DIG. 48 |
| 4,741,871 | 5/1988 | Payha . | |
| 4,752,422 | 6/1988 | Uchida et al. | 261/DIG. 48 |
| 4,776,990 | 10/1988 | Verity | 261/DIG. 48 |
| 4,986,937 | 1/1991 | Sorio | 261/DIG. 15 |
| 5,099,823 | 3/1992 | Nelson . | |

FOREIGN PATENT DOCUMENTS 0272540 12/1986 Japan .......................... 261/DIG. 48

OTHER PUBLICATIONS

Ultrasonic Humdifiers, Consumer Reports, Nov. 1985, pp. 679-683.

Primary Examiner—Tim Miles
Attorney, Agent, or Firm—Terry M. Gernstein

[57] ABSTRACT

A humidifier that can be used on a forced air circulation system for injecting atomized liquid into the cold air portion of that forced air circulation system includes a neubilizer for atomizing water fed thereto. The humidifier can be used in conjunction with an air cooling system and includes a demineralizing filter for removing white dust before the water reaches the humidifier. The filter can take various forms and can include several elements. One form of the humidifier can be connected between a hot air plenum and a cold air plenum of the forced air circulation system whereby the pressure drop between these two plenums is used to move moisture entrained air into the cold air plenum.

15 Claims, 8 Drawing Sheets

HUMIDIFIER USING A NEUBILIZER

TECHNICAL FIELD OF THE INVENTION

The present invention relates to the general art of humidifiers, and to the particular field of humidifiers that are used in conjunction with forced air circulation systems.

BACKGROUND OF THE INVENTION

Many buildings and structures use a central forced air system for heating and/or cooling the building or structure. Many buildings and structures further control the climate therewithin by controlling the humidity as well. Proper humidity has been found necessary for health reasons as well as for comfort reasons and to protect equipment located within the building or structure.

Therefore, the art contains several different designs for humidifiers that can be used in conjunction with a forced air heating system. These designs include: humidifiers that use heating elements such as film boilers, electric heaters and steam tubes that heat water and generate steam which is injected into the furnace; humidifiers that include a spray nozzle in which water is vaporized by nozzle action and injected into the hot air plenum of a furnace; evaporative type humidifiers which include a drum covered with an evaporative pad that revolves into a position for air to be blown across the water-saturated pad and into a furnace plenum; humidifiers using an impeller that sprays a mist of water into the hot air plenum of a furnace; and humidifiers which include a wick inserted into a source of water and has air blown across the saturated portion of the wick and into the forced air system.

Each of these humidifiers has one or more drawbacks, including: reliability, energy-efficiency, and susceptibility to clogging due to minerals in the water. Furthermore, some of these humidifiers may even be subject to problems associated with bacteria, and may be difficult to service and replace parts, thereby increasing the overall cost of the unit. Some of these units may also be difficult to attach to a furnace, and may even cause rust and corrosion. Still further, some of these humidifiers require lime, and cannot be easily drained, and may not have automatic shutoff features in the event that some portion thereof is not operating at a desired efficiency. Still further, "white dust" may create a problem for many of these humidifiers. Heating elements may have limited life expectancy, and moving parts also may have limited life expectancy, both further exacerbating the maintenance costs of any such humidifier. Many of the known humidifiers also cannot be accurately controlled, and cannot be used at all in a cooling situation.

Still further, for various reasons, all of these humidifiers require a downstream connection to a hot air plenum or a hot air portion of the forced air system. Such a requirement creates additional drawbacks and limitations.

Of the humidifiers known to the inventor, none can be used in conjunction with an air cooling, or air conditioning, central forced air system.

Therefore, there is a need for a humidifier that does not need to be connected to a hot air portion of a central forced air system, and can operate when connected to a cold air portion of such a system. Still further, there is a need for a humidifier that can be used in conjunction with a central forced air cooling system.

OBJECTS OF THE INVENTION

It is a main object of the present invention to provide a humidifier that can operate when connected to a cold air portion of a forced air system.

It is another object of the present invention to provide a humidifier that can operate when connected to a cold air portion of a forced air cooling system.

It is another object of the present invention to provide a humidifier that can control humidity in a building to a degree greater than can be exerted using humidifiers known to the inventor.

It is another object of the present invention to provide a humidifier that has a long life expectancy.

It is another object of the present invention to provide a humidifier that has low power consumption.

It is another object of the present invention to provide a humidifier that has no moving parts.

It is another object of the present invention to provide a humidifier that does not require any heat to operate.

It is another object of the present invention to provide a humidifier that virtually eliminates bacterial action passing into the humidity being added to a building.

It is another object of the present invention to provide a humidifier that have virtually no parts that need replacing or repair.

It is another object of the present invention to provide a humidifier that does not require lime for its operation.

It is another object of the present invention to provide a humidifier that does not require large holes in a furnace.

It is another object of the present invention to provide a humidifier that is not likely to rust a furnace associated therewith.

It is another object of the present invention to provide a humidifier that can be easily drained.

It is another object of the present invention to provide a humidifier that can be easily cleaned.

It is another object of the present invention to provide a humidifier in which "white dust" does not present a problem.

It is another object of the present invention to provide a humidifier which is not susceptible to corrosion.

It is another object of the present invention to provide a humidifier that can be used year round.

It is another object of the present invention to provide a humidifier which will automatically shut off if some element thereof is not operating as required.

It is another object of the present invention to provide a humidifier which can have nearly unlimited output capacity.

It is another object of the present invention to provide the humidifier with an over-flow port routed to a floor drain.

SUMMARY OF THE INVENTION

These, and other, objects are achieved by a humidifier that uses ultrasonic means to vaporize water. The humidifier of the present invention further includes at least one filter as well as means for controlling operation of the humidifier in association with a forced air system.

Specifically, ultrasonic technology used in the present invention uses transducers, referred hereinafter to as neubilizers, for atomizing water. The ultrasonic transducers cause water on them to "dance" or "vibrate" at an extremely high rate. This high rate of vibration causes the water to atomize by breaking free from the surface. The atomization occurring in the humidifier of the present invention will occur efficiently whether the forced air system is "hot" or "cold." Atomization occurs in a neubilizer chamber which is fluidically connected to a cold air portion of the forced air system. Water used in the humidifier is filtered at least once, and a float valve controls the amount of water entering the neubilizer chamber. A further switch in the neubilizer chamber ensures that the unit will not operate if the water level in the atomization chamber drops below a preset level. The atomized water flows into the forced air system and adds humidity to the air in a building via that forced air system. A remote control in the building can be used to control the humidifier so the exact amount of humidity desired can be added to the building environment. The humidifier is connected to the forced air system in a manner such that the humidifier is only operative when the forced air system is operating.

Thus, the humidifier of the present invention can be used in conjunction with a cooling system or with a cold air portion of a heating system. The humidifier can thus be used all year round, even in cooling conditions whereby proper humidity can be maintained at all times. Since neubilizers do not require heat for operation and there are no moving parts to speak of in the present humidifier, the humidifier is very reliable and has low maintenance costs. The filters used in connection with the humidifier remove "white dust" thereby further improving the overall operation and reliability of the humidifier. The neubilizers do not require great amounts of power, and thus the humidifier can operate efficiently. Still further, adding more neubilizers to the humidifier is easy, thus making the output of the humidifier easy to increase. Overall control of the humidifier is also quite easy as the neubilizers can be precisely controlled.

BRIEF DESCRIPTION OF THE DRAWING FIGURES

DETAILED DESCRIPTION OF THE PREFERRED EMBODIMENT OF THE INVENTION

Figure 1:
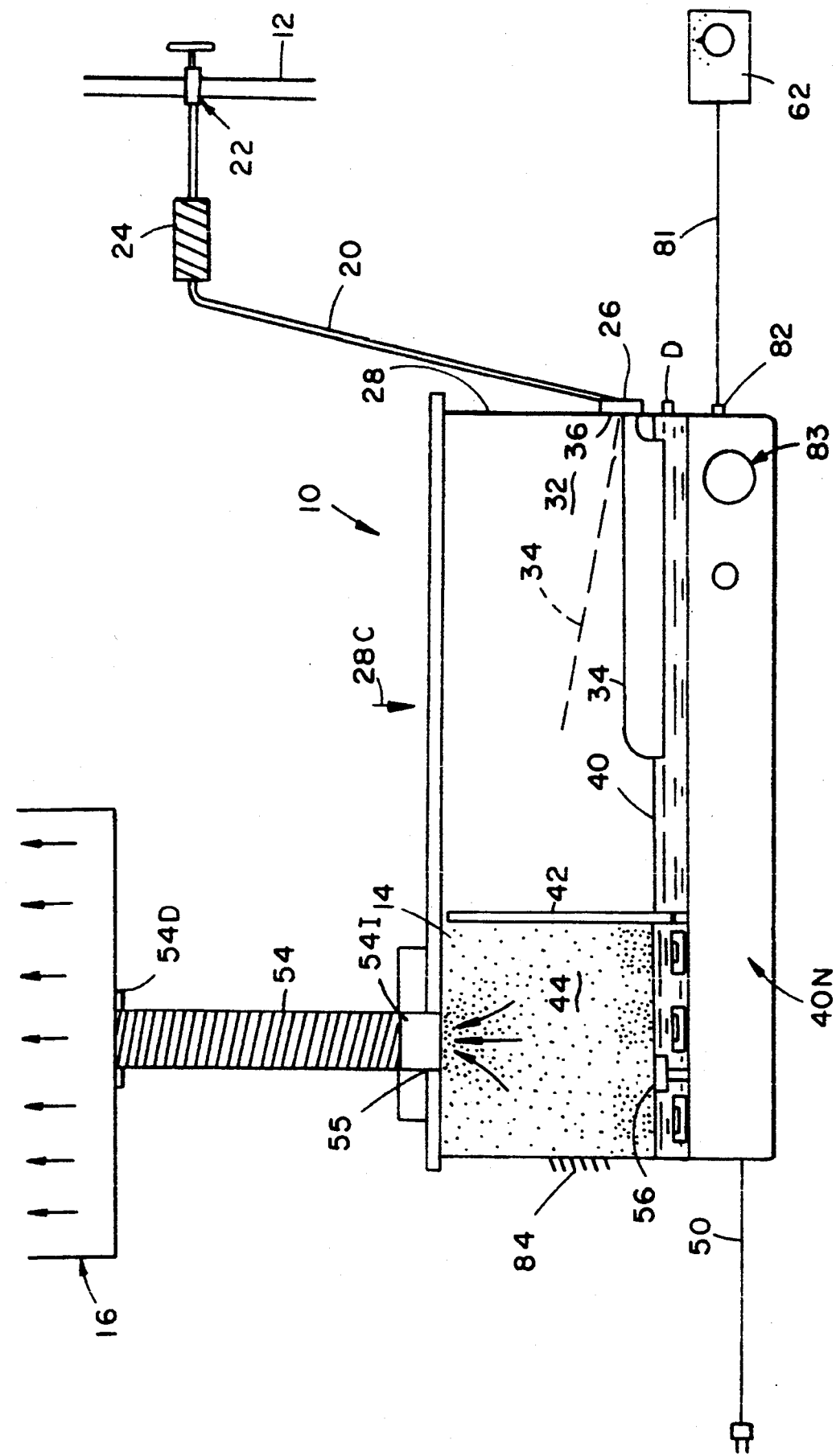
FIG. 1 is a schematic showing the humidifier of the present invention in conjunction with a cold air portion of a forced air system.

Shown in FIG. 1 is a humidifier 10 embodying the present invention and which receives water from a water supply system 12, atomizes that water, and injects atomized water 14 into a cold air portion 16 of a forced air system (not shown in FIG. 1) used to control the climate in a building.

Figure 2:
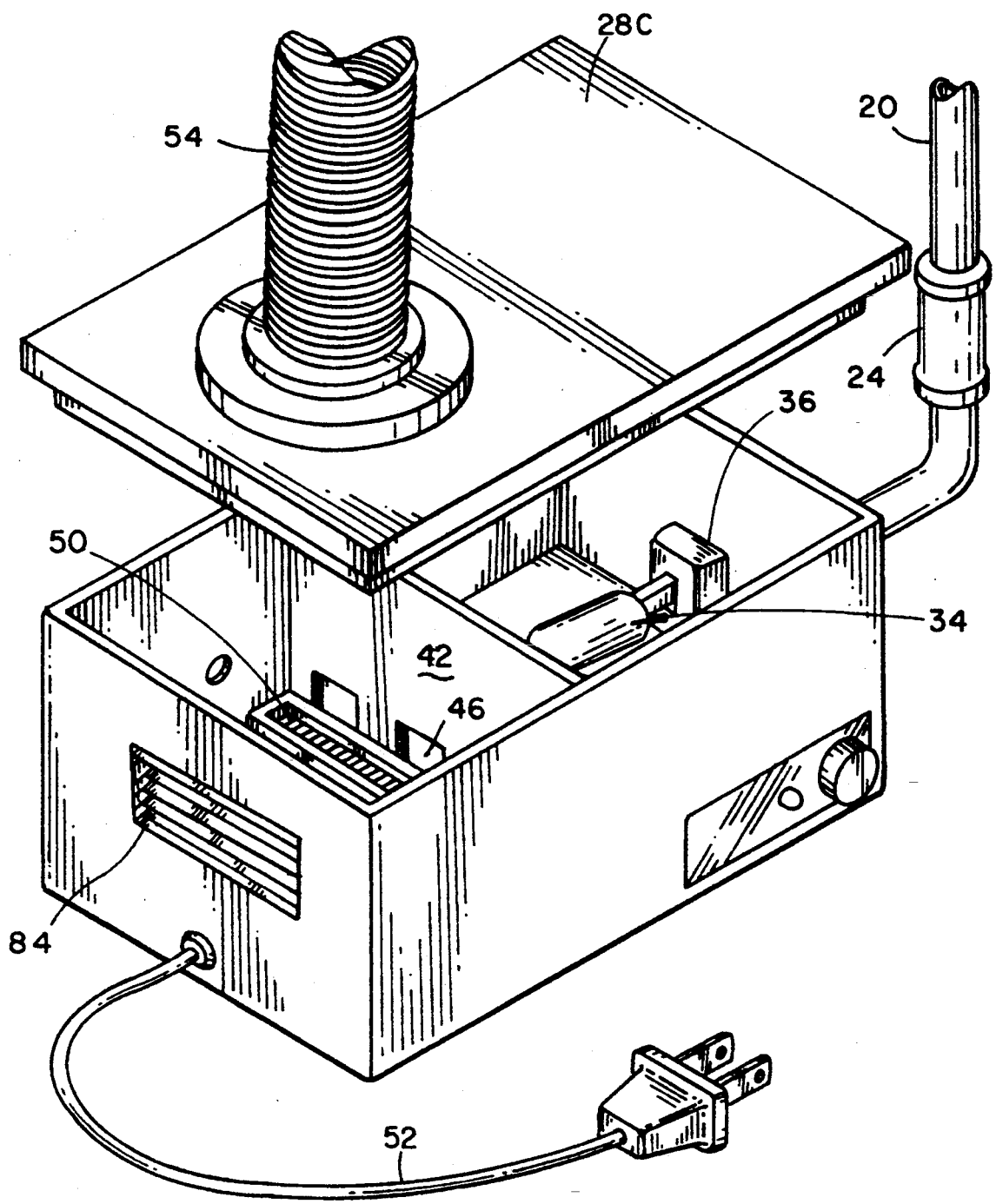
FIG. 2 is an exploded perspective view of the humidifier.

The humidifier 10 is also shown in FIG. 2, and referring to FIGS. 1 and 2, it is seen that water is supplied via an inlet conduit 20 fluidically connected to the supply system 12 by a control valve, or water cock, 22 and which includes a filter 24 to remove minerals from the water. Preferably, filter 24 is a cylindrical filter, but other forms and shapes of such filter can be used. Conduit 20 is connected to an inlet port 26 on a housing 28, with a float 34 located inside the housing in a water inlet chamber 32 and connected to port 26 to close that port when the water level inside the chamber 32 reaches a pre-determined level. The float controlled valve includes a float 34 pivotally connected to the housing and having a port covering portion 36 that permits port 26 to be closed when the float is horizontal on top of a reservoir of water 40 as shown in FIG. 1, and to open the port when that float is at an angle with respect to the FIG. 1 position as shown in dotted lines in FIG. 1.

Housing 28 includes a divider wall 42 that divides water inlet chamber 32 from a neubilizer chamber 44. As indicated in FIG. 2, the divider wall includes at least one flow port 46 through which water passes from chamber 32. At least one neubilizer 50 are located in chamber 44. Preferably, there are a plurality of neubilizers in chamber 44. The neubilizer ultrasonically atomizes water 40N to generate atomized droplets 14 in chamber 44. Power is supplied to the neubilizer via a power cord 52, and the humidifier is controlled according to a circuit shown in FIG. 3 and discussed below to operate when the forced air system is operating to produce atomized particles in quantities sufficient to establish a desired humidity in a building or structure serviced by the forced air system associated with the cold air plenum 16. The atomized particles are sucked into the plenum 16 via a connection conduit 54O and inlet end 54I thereof being fluidically connected to chamber 44 via an outlet port 55 located on a cover 28C removably mounted on housing 28 and an outlet end 54O thereof being fluidically connected to the plenum 16 whereby a pressure drop established between plenum 16 and chamber 44 creates a pressure gradient that moves atomized water particles into plenum 16. While the pressure drop range on most forced air circulation systems vary from one model to another, most such systems use a turbine or "squirrel cage" type blower system. The negative air pressure in the cold air portion of such systems with respect to ambient, especially close to the blower, is generally sufficient to operate the humidifier of the present invention. In general, because of the variation in pressure at various locations along the plenum, it is preferred to keep conduit 54 as short as possible and located the outlet end thereof as close to the blower cage as possible. This close location will improve the efficiency of the humidifier by establishing as large a pressure drop across the humidifier as possible. It is also noted that the humidifier of the present invention will operate well with forced air systems using blowers with multiple speeds as well as blowers operating at one speed. A water level sensor 56 is positioned in chamber 44 and automatically deactivates the neubilizer if water level adjacent to the neubilizer falls below a specified level, such as would uncover the neubilizer. The water level switch can be any common water level sensing switch as will be known to one skilled in the art based on the teaching of this disclosure.

Figure 3:
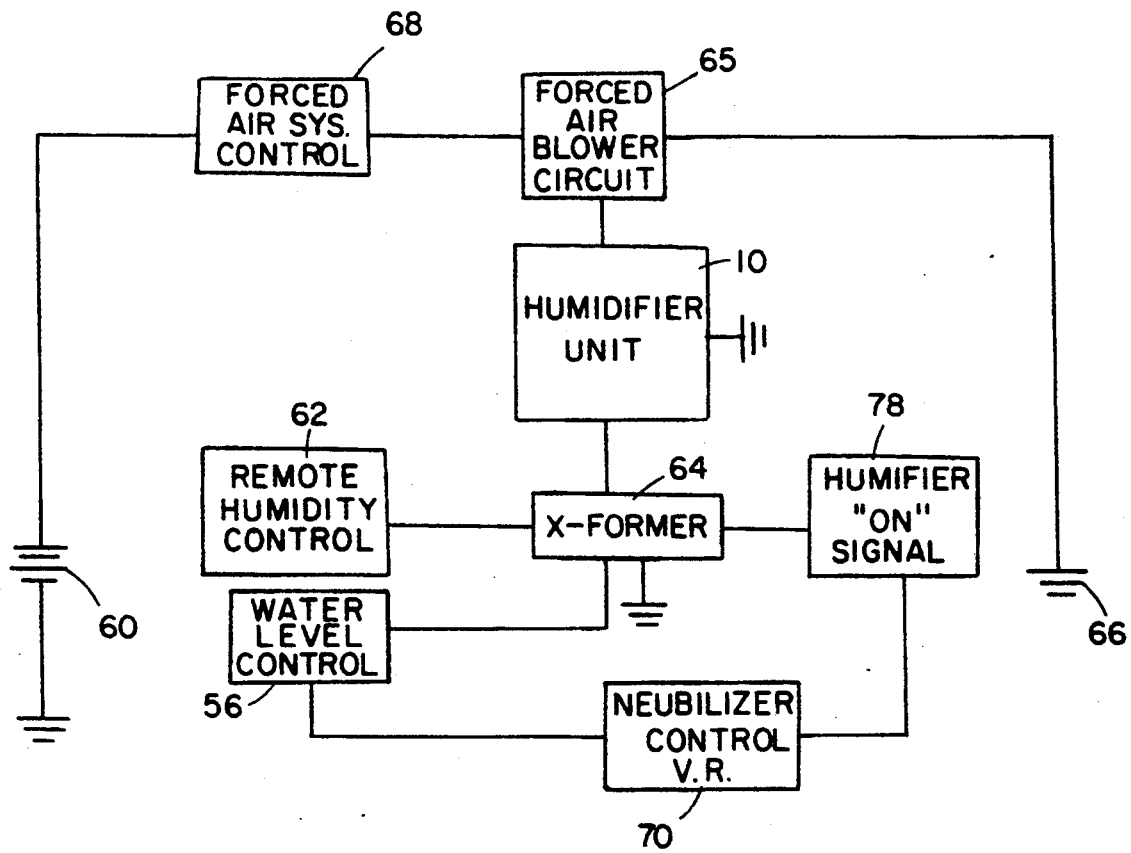
FIG. 3 is a block diagram showing the overall control of the humidifier.

As mentioned above, humidifier 10 can be controlled so a building can have any humidity desired, and is operative only when the forced air system is operating. A control circuit is shown in FIG. 3, and attention is adverted thereto for the ensuing discussion. As shown in FIG. 3, humidifier 10 is connected to a source of building power 60 via a remote control unit 62, such as a humidistat, or the like. The humidistat is known to those skilled in the art based on the teaching of the present disclosure, and thus will not be further discussed. Remote control unit 62 is connected to the neubilizers via a power transformer 64 whereby power in the proper form is applied to the neubilizer. Humidifier 10 is also connected to circuit 65 associated with a blower unit of the forced air system whereby, the humidifier is grounded via that blower unit. This connection means that the humidifier will only be activated when the blower unit is activated. The blower unit is connected to the source of building power and to ground 66 via a system control 68 whereby it can be activated independently of the humidifier. Further control of the humidifier can be exercised using a control unit 70 that controls the amount of ultrasonic energy output from the neubilizer whereby the amount and quality of water atomization is controlled. Control unit 70 can be adjusted independently of the main control unit 62. Control unit 70 can be set at the factory, and adjusted by a workman installing or servicing the humidifier. The level of water associated with activation of the float valve can be set at the factory and adjusted by an installer whereby a desired level of water is attained and maintained in chambers 32 and 44 as above discussed. A signal element 78 is connected to the humidifier to emit a visible signal when the humidifier is operating. Signal element 78 preferably is an LED lamp. As shown in FIG. 1, the humidistat 62 is connected to the humidifier by a line 81 connected to a jack 82 and a control knob 83 is associated with control circuit 70.

Ambient air is injected into the neubilizer chamber via a vent 84 whereby a flow of air is established from chamber 44 to chamber 16 which entrains atomized liquid particles 14 and carries those particles into the plenum 16. The vent can be located anywhere on the housing adjacent to chamber 44. A special blower 86 can also be fluidically connected to the vent to inject pressurized air into chamber 44 if suitable. Blower 86 can be controlled by a special knob on the humidifier or on remote control unit 62.

The humidifier can be fabricated out of any suitable material, including plastic, and can include a drain D if desired.

In operation, humidifier 10 is connected to water source 12 and atomizes water when the forced air system is operating in quantities set according to controls 62 and 83, and ingests this atomized water into the cold air plenum 16. The humidifier shuts off when the forced air system is deactivated, or when the magnetic water-level switch 56 generates a shutdown. Water used to humidify the building is filtered by filter unit 24, and the unit can be serviced or cleaned by removing cover 28C.

Figure 6:
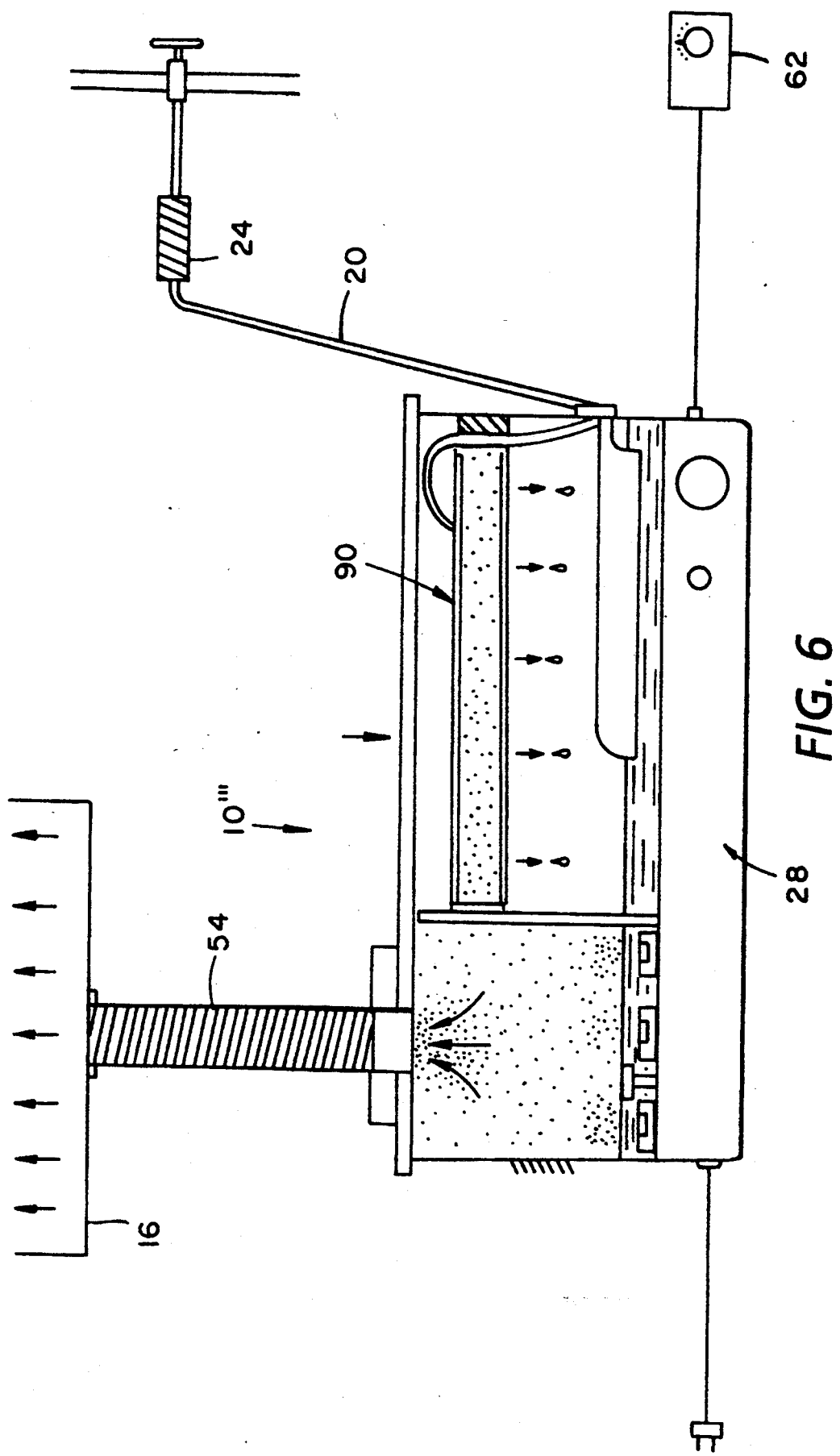
FIG. 6 shows an alternative form of the humidifier having a pre-filter for sediment located external to the humidifier and a demineralization filter located inside the humidifier.
Figure 7:
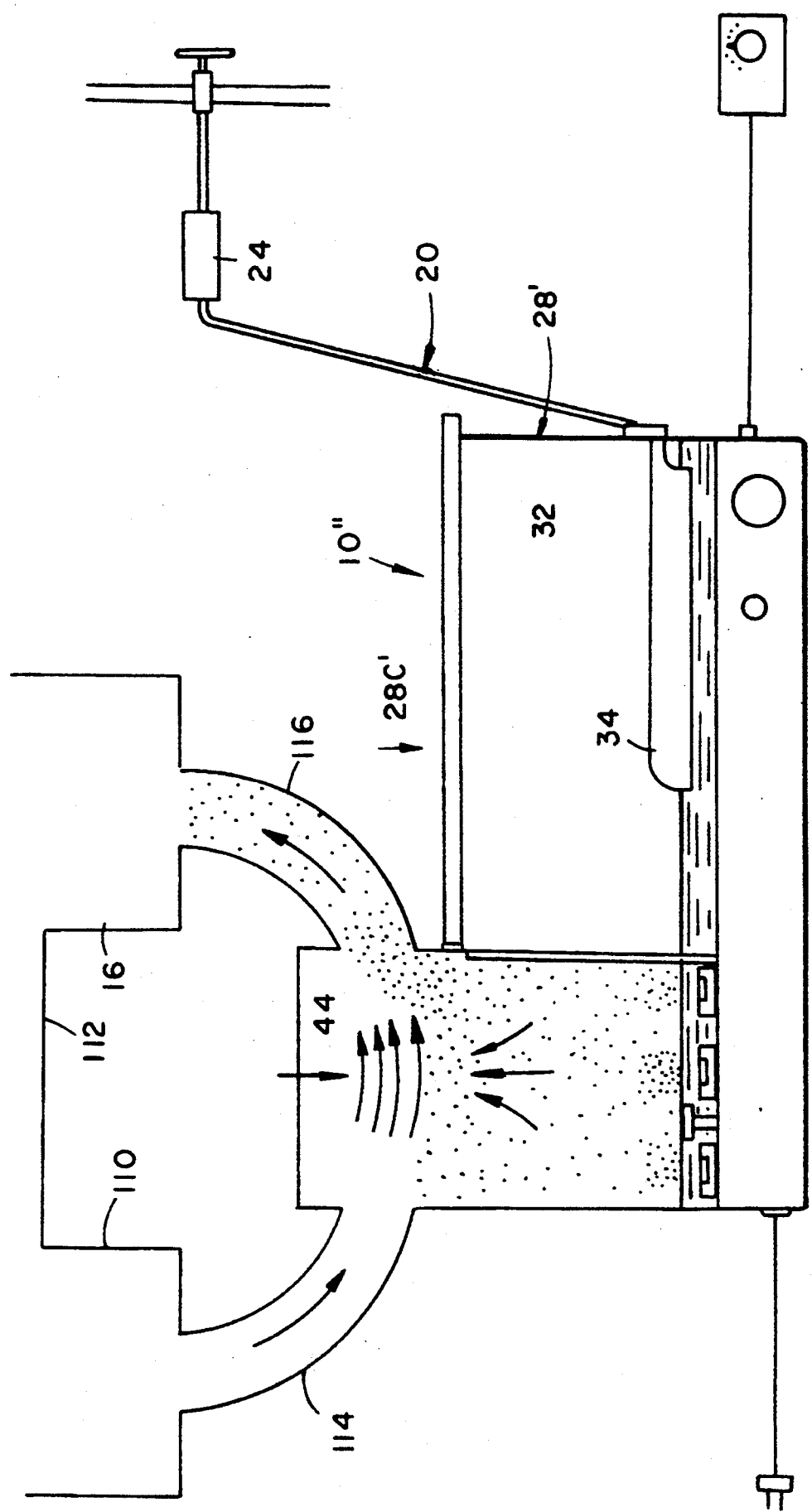
FIG. 7 shows an alternative form of the humidifier having a fluid connection to both the hot air portion of a forced air system and to the cold air portion of that system.

The system shown in FIG. 1 is amenable to use in conjunction with a municipally treated water supply and only includes a single filter 24 which is cylindrical. However, it is also contemplated that other forms of the humidifier can be used in other situations, such as other forms of filtering as indicated in FIGS. 4–6, and with a further connection to a forced air system as shown in FIG. 7.

Figure 9:
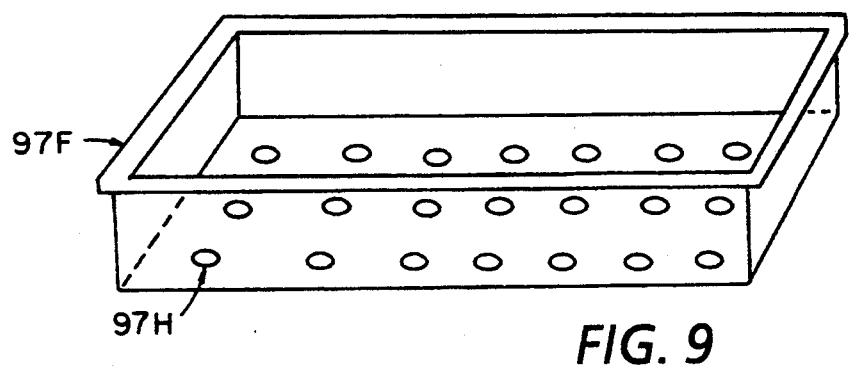
FIG. 9 is a container for the demineralizing filter as shown in FIG. 8.
Figure 4:
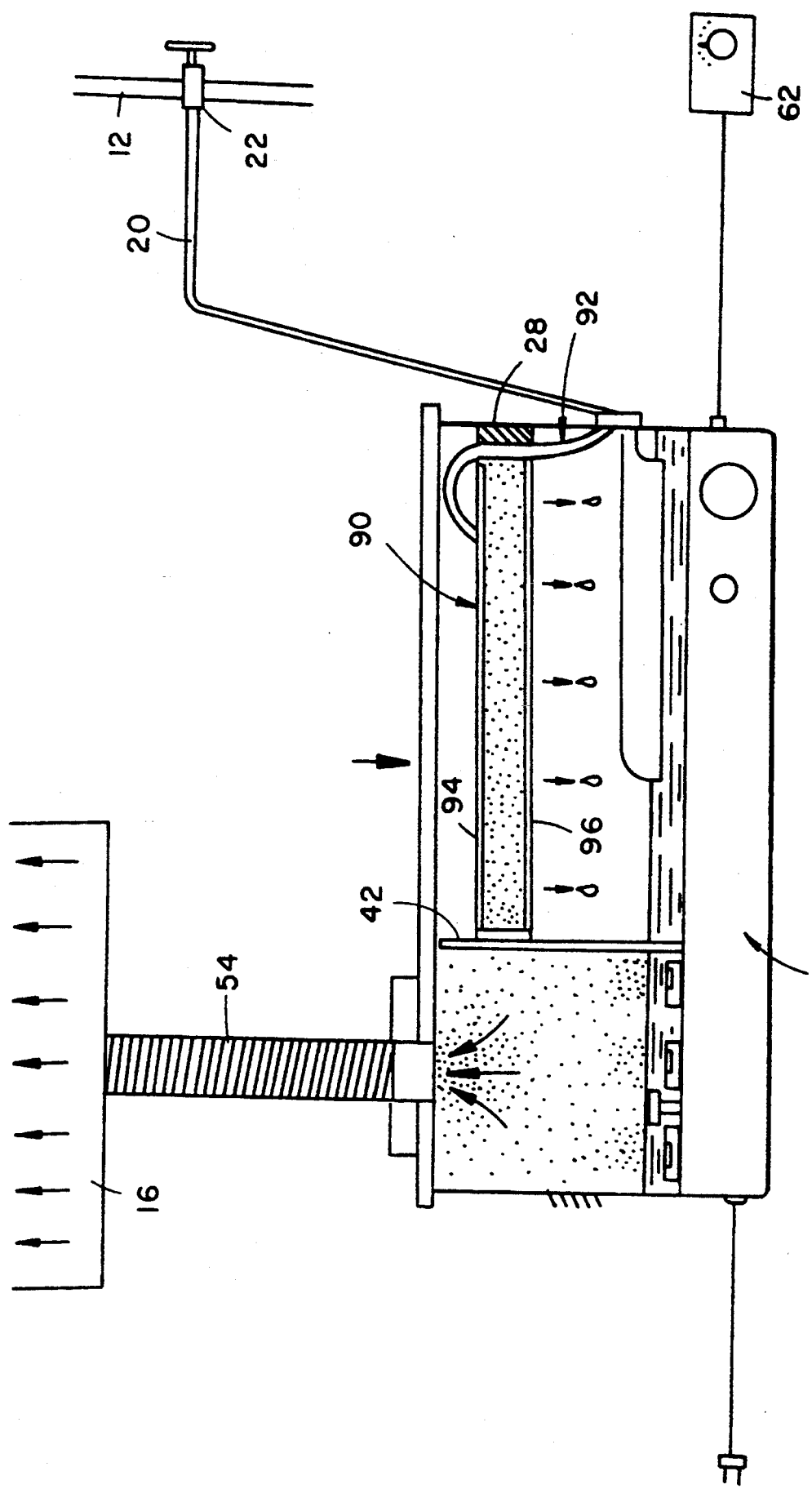
FIG. 4 shows an alternative form of the humidifier having a demineralizing filter located in the humidifier.
Figure 8:
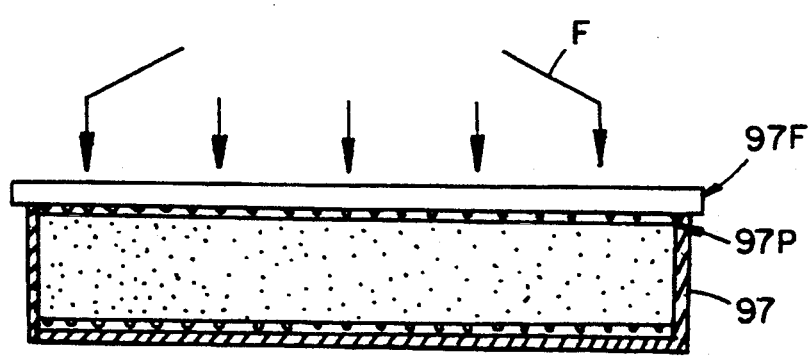
FIG. 8 is one form of demineralizing filter used in conjunction with the humidifier of the present invention.

An alternative form of the humidifier is shown in FIG. 4 as humidifier 10' and includes a filter 90 located internally of housing 28. Humidifier 10' substitutes filter 90 for filter 24 in humidifier 10, with an additional fluid conduit 92 fluidically connected to port 26 to direct liquid to an inlet side 94 of the filter. Filtered water exits filter 90 via exit side 96. Otherwise, humidifier 10' functions and operates in the same manner as humidifier 10. Filter 90 can be removed for inspection or disposal and preferably is a cartridge type demineralizing filter. Filter 90 is also shown in FIG. 8, and the container 97 therefor is separately shown in FIG. 9. The container includes a flange 97F and a plurality of drip holes 97H and a wall and bottom formed of clear plastic. Water flow is indicated in FIG. 8 by arrows F. The filter material is preferably a color-change ion exchange resin sandwiched between two thin fiber pads, such as pad 97P. Water drips onto the filter 97 to be filtered thereby. While passing through the pads and resins, the minerals in the water are removed. A visual indication is made when the filter is in need of cleaning or replacement. The filter or filters of the present invention remove calcium carbonate, which is a major component of "white dust."

Figure 10:
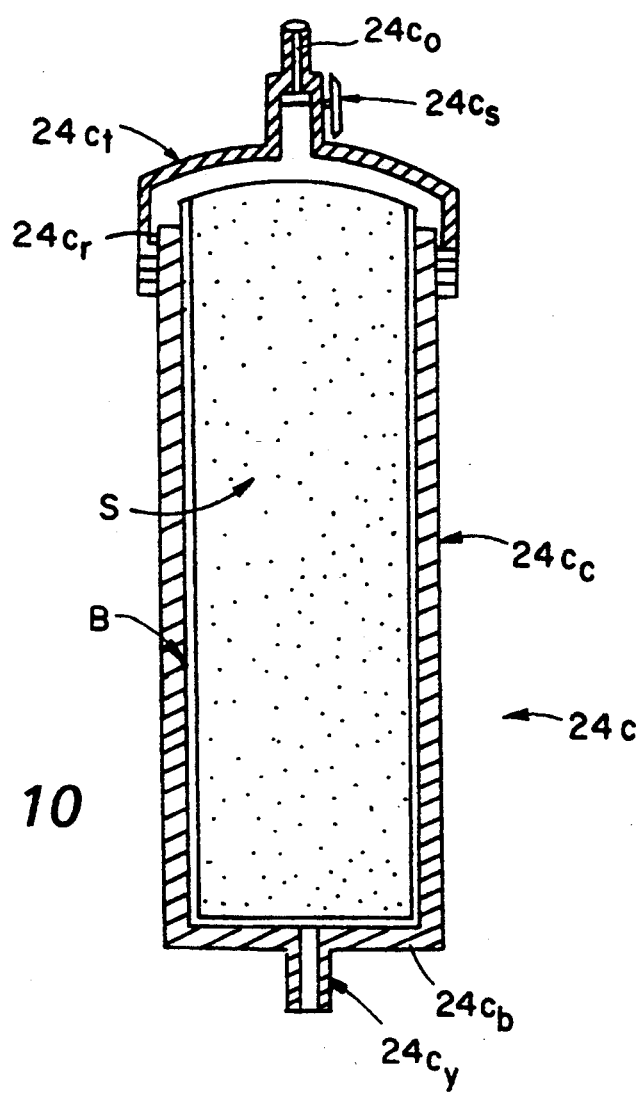
FIG. 10 is another form of external demineralizing filter used in conjunction with the humidifier of the present invention.

A further form of the filter is shown in FIG. 10 as filter 24C. Filter 24C includes a case $24C_c$ that can be a polymer material, a bottom $24C_b$ having a water inlet $24C_i$, a cap $24C_t$ having a water outlet $24C_o$ and a shut-off valve $24C_s$. The cap is threadably attached to the case and a seal $24C_r$ ensures proper closure of the case. Synthetic ion-exchange resins S are located in a bag B located inside the case. Water enters the case through the water inlet in the bottom of the case, flows upwardly through the resins, and has the minerals therein removed. The purified water exits through the water outlet at the top of the case, past the shutoff valve and into the water inlet chamber 32 of the humidifier. Filter 24C is an inline filter that is located as shown for filter 24 in FIG. 1. Filter 24C can be reactivated by immersing the filter pouch containing the resins in a solution of water and de-iodized salt. Reactivating the filter is less expensive than purchasing new filters. If more filtering is required, additional ion-exchange resins can be used. The long, narrow cylinder permits a longer residence time for the water, thereby increasing filtering efficiency.

Figure 5:
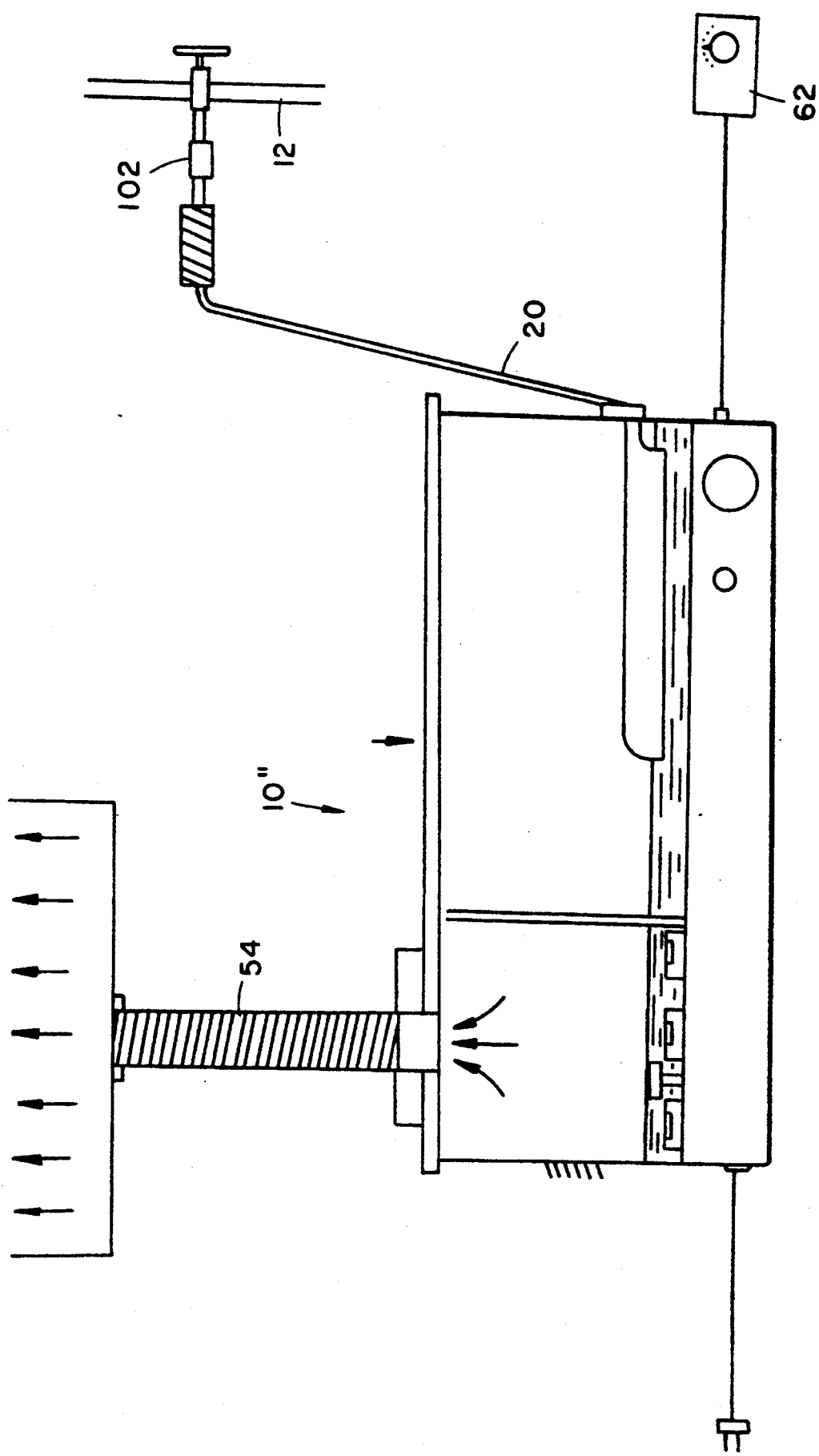
FIG. 5 shows an alternative form of the humidifier having a pre-filter located adjacent to an external demineralizing filter.

A further alternative form of the humidifier is shown in FIG. 5 as humidifier 10", and is identical to humidifier 10 with the exception of the inclusion of a pre-filter 102 between fluid source 12 and filter 24. Humidifier 10" is suitable for use in a rural area with "untreated" water. Pre-filter 102 is designed to remove suspended particulate (sediment) in the water supply before it enters the housing of the demineralizing filter.

Humidifier 10''' is shown in FIG. 6 and includes an internal filter 90' as well as a filter element 24'. Filter element 90' is a cartridge-type demineralization filter, and filter element 24' is a sediment filter. The filter 24' removes suspended particulate (sediment) in the water before the water reaches the housing of the demineralizing filter.

A further alternative form of the humidifier is shown in FIG. 7 as humidifier $10^{IV}$. Humidifier $10^{IV}$ is fluidically connected to the hot air portion, or hot air plenum 110 of a furnace 112 to receive input air therefrom. This input air is used to carry atomized liquid to the cold air plenum 16 of the furnace, and the set up shown in FIG. 7 replaces the vent shown in FIG. 1 with the pressure drop and air supply associated with the hot and cold air plenums of the furnace. Flexible hoses 114 and 116 are respectively connected to the housing 28 to feed hot air to chamber 44 and liquid entrained air from chamber 44 to cold air plenum 16. While only filter 24 is shown in connection with humidifier $10^{IV}$, the other filter arrangements shown in FIGS. 4–6 can also be used without departing from the scope of this disclosure. As can also be seen in FIG. 7, housing 28' includes a cover 28C' which covers only the water inlet chamber 32.

It is understood that while certain forms of the present invention have been illustrated and described herein, it is not to be limited to the specific forms or arrangements of parts described and shown.

I claim:

1. A humidifier for use with a forced air circulation system in a building comprising:
   A) a housing having a water inlet chamber with a top, and a neubilizer chamber fluidically connected to said water inlet chamber;
   B) an inlet conduit fluidically connecting said water inlet chamber to a source of water;
   C) a hose fluidically connected to said inlet conduit and having an outlet located near the top of the inlet chamber;
   D) a filter means located inside said housing for filtering water before said water is stored in said water inlet chamber, said filter means being located in said housing and including
      (1) a container having a flange means on an outer surface thereof for mounting said container on said housing beneath said outlet,
      (2) a plurality of flow holes defined through a bottom of said container,
      (3) a filter element removably supported in said container, and
      (4) said outlet being located above said filter element to drop water from the source onto said filter element with water flowing through said filter element and into said water inlet chamber;
   E) a neubilizer in said neubilizer chamber for atomizing water in said neubilizer chamber;
   F) a connection conduit fluidically connecting said neubilizer chamber to a cold air portion of a forced air circulation system for ingesting atomized water into the cold air portion; and
   G) control means for controlling said neubilizer whereby the amount of atomized water can be controlled and which includes:
      (1) a float valve means in said water inlet chamber beneath said filter means for controlling the amount of water flowing into said water inlet chamber, and
      (2) means for connecting said neubilizer to the forced air circulation system whereby said neubilizer can be activated only when the forced air system is operating.

2. The humidifier defined in claim 1 further including a water shutoff valve in said inlet conduit.

3. The humidifier defined in claim 1 wherein said control means includes a visible signal which is activated when said neubilizer is activated.

4. The humidifier defined in claim 1 wherein said housing includes a cover removably mounted thereon.

5. The humidifier defined in claim 1 wherein said forced air circulation system includes a heating furnace.

6. The humidifier defined in claim 1 further including a vent on said housing and fluidically connected to said neubilizer chamber and fluidically connected to said connection conduit for ingesting ambient air into the cold air duct via said neubilizer chamber and into said connection conduit whereby atomized water is entrained in ambient air flowing from said vent to said cold air duct.

7. The humidifier defined in claim 1 further including a drain connected to said housing.

8. The humidifier defined in claim 1 further including an air intake conduit fluidically connecting said neubilizer chamber to a hot air duct of the forced air circulation system for directing heated air from the forced air system into said neubilizer chamber.

9. The humidifier defined in claim 1 further including an air blower connected to said neubilizer chamber for forcing ambient air into said neubilizer chamber.

10. The humidifier defined in claim 1 wherein said means for controlling said neubilizer includes humidity selection control means located remotely from said housing.

11. The humidifier defined in claim 10 wherein said means for controlling said neubilizer further includes a water level sensing element for turning said neubilizer off when water level in said neubilizer chamber drops below a pre-set value.

12. The humidifier defined in claim 1, further including a white dust filter located in said inlet conduit upstream of said housing.

13. The humidifier defined in claim 12 further including a pre-filter located between said white dust filter and the source of water.

14. The humidifier defined in claim 1 wherein said filter further includes a color-change ion exchange resin in said case.

15. The humidifier defined in claim 14 wherein said filter further includes a fiber pad on said ion exchange resin.

* * * * *